United States Patent [19]
Matsumoto et al.

[11] Patent Number: 6,117,937
[45] Date of Patent: Sep. 12, 2000

[54] POLYMER POLYOL AND FLAME RETARDANT POLYURETHANE RESIN AND FOAM PREPARED THEREFROM

[75] Inventors: Shinsuke Matsumoto; Ariko Nishikawa; Tsukuru Izukawa, all of Aichi-ken; Masahiro Isobe; Kazuhiko Okubo, both of Kanagawa-ken, all of Japan

[73] Assignee: Mitsui Chemicals Inc., Japan

[21] Appl. No.: 09/028,525

[22] Filed: Feb. 24, 1998

[30] Foreign Application Priority Data

| Feb. 27, 1997 | [JP] | Japan | 9-043928 |
| Apr. 25, 1997 | [JP] | Japan | 9-108710 |
| Jun. 6, 1997 | [JP] | Japan | 9-149083 |

[51] Int. Cl.$^7$ ........................................... C08K 5/05
[52] U.S. Cl. .......................... 524/765; 521/155; 521/170; 521/174
[58] Field of Search ............................ 524/765; 521/155, 521/170, 174

[56] References Cited

U.S. PATENT DOCUMENTS

| 3,304,273 | 2/1967 | Stamberger . |
| 4,503,207 | 3/1985 | Heyman . |
| 4,555,527 | 11/1985 | Heyman . |
| 4,721,733 | 1/1988 | Gastinger et al. . |

FOREIGN PATENT DOCUMENTS

| 0351080 | 1/1990 | European Pat. Off. . |
| 361447 | 4/1990 | European Pat. Off. . |
| 2646141 | 4/1978 | Germany . |
| 51-073588 | 6/1976 | Japan . |
| 52-000997 | 1/1977 | Japan . |
| 1486046 | 9/1977 | United Kingdom . |

*Primary Examiner*—John M. Cooney, Jr.
*Attorney, Agent, or Firm*—Burns, Doane, Swecker & Mathis, L.L.P.

[57] ABSTRACT

A polymer dispersed polyol having a vinyl polymer dispersed in polyol, the vinyl polymer comprising containing 5 to 80 wt % of acrylamide compound (A) represented by the formula (1):

$$CH_2=CR^1CONR^2R^3 \qquad (1)$$

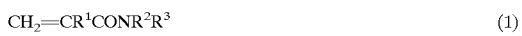

wherein $R^1$, $R^2$ and $R^3$ are a hydrogen atom or hydrocarbon group having 1 to 10 carbon atoms, 0 to 70 wt % of one or more monomer (B) selected from acrylonitrile and methacrylonitrile, and 0 to 95 wt % of a vinyl monomer (C) which can copolymerize with (A) and (B), and 95 to 20 wt % of the total amount of (B) and (C); and when (C) is 0 wt %, (A) is the polymer of a vinyl monomer mixture containing an acrylamide derivative represented by the formula (2):

$$CH_2=CR^4CONR^5R^6 \qquad (2)$$

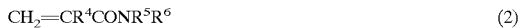

wherein $R^4$, $R^5$ and $R^6$ are a hydrogen atom or hydrocarbon group having 1 to 10 carbon atoms, and not simultaneously the hydrogen atom; and said polyol comprising containing 5 to 50 wt % of the vinyl polymer, and flame retardant polyurethane resin and flame retardant polyurethane foam which are prepared from the same.

20 Claims, No Drawings

POLYMER POLYOL AND FLAME RETARDANT POLYURETHANE RESIN AND FOAM PREPARED THEREFROM

BACKGROUND OF THE INVENTION

1. Field of the Invention

The present invention relates to polymer polyol, and flame retardant polyurethane resin and flame retardant polyurethane foam which are prepared from the same.

Polymer polyol of the invention is a graft copolymer in polyol, which can be prepared by polymerizing the specific vinyl monomers in polyol to disperse microparticles of the resulting vinyl polymer in the polyol, and is very useful for flame retadant polyurethane resin and foam.

2. Prior Art of the Invention

Polyol which is obtained by polymerizing styrene, acrylonitrile or other vinyl monomers in the polyol and contains dispersed polymer microparticles has been conventionally called polymer polyol, polymer dispersed polyol or graft copolymer in polyol (hereinafter referred to as polymer dispersed polyol) and has been used for preparation of polyurethane foam and polyurethane elastomer.

Particularly when polymer dispersed polyol is used for preparing flexible polyurethane foam, effects such as increase in open cell content and improvement in indentation hardness can be obtained on the resultant foam.

As to the preparation method of flame retardant polyurethane, it has been conventionally known to disperse melamine in polyol as a flame retardant or to add tris(2-chloroethyl) phosphate, tris(β-chloropropyl) phosphate and other halogen containing flame retardants.

However, addition of these flame retardants leads to problems, for example, properties of polyurethane lower remarkably, melamine has markedly poor dispersion stability in polyol compared with a conventional polymer dispersed polyol, halogen containing flame retardants cause fogging in automobile application or generate halogen containing gas and other hazardous materials in case of combustion and is unfavorable in view of environmental protection.

On the other hand, conventional polymer polyol has a problem of no effect on flame retardance of polyurethane, and actually impairs flame retardance of polyurethane.

As to polymer dispersed polyol which exhibits effect on flame retardance of polyurethane, Japanese Patent Publication 2527006 has disclosed polymer dispersed polyol obtained by dispersing aldehyde condensate base resin microparticles, or other polymer dispersed polyol is also known to be obtained by polymerizing a halogen containing monomer in polyol.

However, according to the trace examination by the inventors of the invention, the aldehyde condensate based resin microparticles dispersed in polyol lead to impairing of polyurethane properties such as humid aged compression set which effects the durability of polyurethane in particular. Polymer dispersed polyol prepared from a halogen containing monomer is environmentally unfavorable due to the presence of halogen.

On the other hand, Japanese Laid-Open Patent SHO 51-73588 has disclosed a preparation process of a polymer-polyol composition comprising conducting radical copolymerization of one or more compounds selected from acrylonitrile and methacrylonitrile with one or more compounds selected from acrylamide and methacrylamide, and a preparation process of polyurethane by using the same. The patent has taught that viscosity of polymer dispersed polyol can be reduced by copolymerization of (meth)acrylonitrile and (meth)acrylamide.

Further, U.S. Pat. Nos. 4,503,207 and 4,555,527 have disclosed a preparation process of polymer dispersed polyol comprising conducting radical polymerization of acrylamide or methacrylamide in polyol in the presence of water and polyol having a polymerizable carbon-carbon double bond, that is, a so-called dispersion stabilizer, and polyurethane foam and elastomer obtained by using the same. These patents have taught that the polymer dispersed polyol obtained by using acrylamide in the presence of a dispersion stabilizer can reduce viscosity by micro dispersion of polymer particles. However, no description has been found at all on the flame retardant effect of the polymer dispersed polyol for polyurethane.

The examination conducted by the inventors has revealed that polymer dispersed polyol prepared by dispersing the above polyacrylamide or a polymer obtained from (meth)acrylamide and (meth)acrylonitrile in polyol can also exert flame retardance to some extent in some cases. However, polyurethane prepared from such polymer dispersed polyol greatly impairs durability, humid aged compression set in particular. Furthermore, the resin component obtained by mixing polymer dispersed polyol, water as a blowing agent, catalyst and cell regulator in polyurethane preparation has extremely poor storage stability required for practical application and thus the object of the present invention cannot be attained.

The object of the invention is to provide polymer dispersed polyol which has an effect as a raw material of flame retardant polyurethane having excellent humid aged compression set and other durability, the preparation process of the same, and flame retardant polyurethane resin and flame retardant polyurethane foam which are prepared from the same.

Another object of the invention is to provide polyurethane foam which passes FWVSS 302, has self-extinguishing property in accordance with JIS D-1201, a test method of combustion quality of organic materials for automobile interiors, has an oxygen index of 18 or more and a humid aged compression set of 20% or less; and polyurethane resin which has an oxygen index of 18 or more and a humid aged compression set of 10% or less.

SUMMARY OF THE INVENTION

As a result of an intensive investigation in order to achieve the above objects, the present inventors have found a novel polymer dispersed polyol containing dispersion of a vinyl polymer microparticle having new composition in the polyol. Thus, the present invention has been completed.

That is, various aspects the present invention are:

1. Polymer dispersed polyol having a vinyl polymer dispersed in polyol, the vinyl polymer prepared from vinyl monomer comprising 5 to 80 wt % of acrylamide compound (A) represented by the formula (1):

$$CH_2=CR^1CONR^2R^3 \quad (1)$$

wherein $R^1$, $R^2$ and $R^3$ are a hydrogen atom or hydrocarbon group having 1 to 10 carbon atoms, 0 to 70 wt % of one or more monomer (B) selected from acrylonitrile and methacrylonitrile, and 0 to 95 wt % of a vinyl monomer (C) which can copolymerize with (A) and (B), and 95 to 20 wt % of the total amount of (B) and (C); and when (C) is 0 wt %, (A) is a vinyl monomer containing an acrylamide derivative represented by the formula (2):

$$CH_2=CR^4CONR^5R^6 \quad (2)$$

wherein $R^4$, $R^5$ and $R^6$ are a hydrogen atom or hydrocarbon group having 1 to 10 carbon atoms, and not simultaneously the hydrogen atom; and said polyol comprising 5 to 50 wt % of the vinyl polymer.

2. Polymer dispersed polyol according to the above 1 wherein the acrylamide compound (A) is one or more compounds selected from acrylamide and methacrylamide, and an acrylamide derivative represented by the formula (2) above.

3. Polymer dispersed polyol according to the above 2 wherein the acrylamide derivative is one or more compounds selected from the group consisting of N,N-dimethylacrylamide, N,N-dimethylaminomethylacrylamide, N,N-dimethylaminopropylacrylamide, N-isopropylacrylamide, N,N-diethylacrylamide and N,N-dimethylmethacryloylamide.

4. Polymer dispersed polyol according to the above 1 wherein the vinyl monomer (C) which is copolymerizable with the above (A) and (B) is one or more compounds selected from the group consisting of:

(i) an aromatic vinyl monomer, (ii) a compound represented by the formula (3):

$$CH_2=CR^7-COO-R^8 \quad (3)$$

(iii) a compound represented by the formula (4):

$$CH_2=CR^9-OCO-R^{10} \quad (4)$$

(iv) a compound represented by the formula (5):

$$CH_2=CR^{11}-COO-R^{12}-NR^{13}R^{14} \quad (5)$$

wherein, in the formulas (3) to (5), $R^7$, $R^9$ and $R^{11}$ are a hydrogen atom or methyl group, $R^8$ and $R^{10}$ are an alkyl group having 1 to 20 carbon atoms, $R^{12}$ is an alkylene group having 1 to 6 carbon atoms, $R^{13}$ and $R^{14}$ are a hydrogen atom or alkyl group having 1 to 6 carbon atoms and are not simultaneously a hydrogen atom, and (v) acrylic ester or methacrylic ester except the compounds represented by the formulas (3) and (5).

5. Polymer dispersed polyol according to the above 1 wherein the vinyl monomer (C) which is copolymerizable with the above (A) and (B) contains 5 to 60 wt % of an aromatic vinyl monomer.

6. Polymer dispersed polyol according to the above 1, wherein the vinyl polymer (C) which is copolymerizable with the above (A) and (B) contains 5 to 60 wt % of the aromatic vinyl monomer, and comprises a compound represented by the above formulas (3) to (5) and one or more compounds selected from the group consisting of acrylic ester or methacrylic ester except the compounds represented by the formulas (3) and (5), and the total amount of the compound except the aromatic vinyl monomer in (C) and one or more compounds (B) selected from acrylonitrile and methacrylonitrile is from 15 to 90 wt %.

7. Polymer dispersed polyol according to the above 5 or 6 wherein the aromatic vinyl monomer is styrene.

8. Polymer dispersed polyol according to the above 4 or 6 wherein the compound represented by the formula (3) is one or more compounds selected from methyl methacrylate and butyl acrylate.

9. Polymer dispersed polyol according to the above 4 or 6 wherein the acrylic ester or methacrylic ester compound except the compound represented by the formulas (3) and (5) is one or more compounds selected from the group consisting of glycidyl methacrylate, hydroxyethyl methacrylate and hydroxypropyl methacrylate.

10. Polymer dispersed polyol according to the above 1 wherein the vinyl monomer (C) which is copolymerizable with the above (A) and (B) contains less than 0 to 5 wt % of styrene and a monomer except styrene, and the total amount of the monomer except styrene in (C) and one or more monomers (B) selected from acrylonitrile and methacrylonitrile is from 20 to 95 wt %.

11. Polymer dispersed polyol according to the above 2 wherein the vinyl monomer (C) which is copolymerizable with the above (A) and (B) contains 0 to less than 5 wt % of styrene, and the compound represented by the formulas (3) to (5), and an acrylic ester or methacrylic ester compound except the compound represented by the formulas (3) and (5), and the total amount of the compound represented by the formulas (3) and (5), and an acrylic ester or methacrylic ester compound except the compound represented by the formulas (3) and (5), and, one or more monomer (B) selected from acrylonitrile and methacrylonitrile is from 20 to 95 wt %.

12. Polymer dispersed polyol according to the above 1 wherein the acrylamide compound (A) is one or more compounds selected from the group consisting of acrylamide and methacrylamide, and a vinyl monomer (C) contains 1 to 60 wt % of one or more compounds represented by the formulas (3), (4) and (5) and 0 to 5 wt % of styrene, and the total amount of the compounds (C) except the both styrene and compound represented by the formulas (3) to (5) and one or more monomer (B) selected from acrylonitrile and methacrylonitrile is from 19 to 94 wt %.

13. Polymer dispersed polyol according to the above 1 obtained by polymerizing in a polyol a monomer mixture containing an acrylamide compound (A), one or more monomers (B) selected from acrylonitrile and methacrylonitrile and a vinyl monomer (C) which is copolymerizable with (A) and (B).

14. Polymer dispersed polyol according to the above 1 wherein the polyol is a mixture of one or more polyols selected from polyoxyalkylene polyol, polyester polyol and polyester ether polyol having an average functionality of 1 to 8 and hydroxyl value of 10 to 600 mgKOH/g.

15. Flame retardant polyurethane resin obtained by reacting an active hydrogen compound with polyisocyanate wherein the active hydrogen compound is polymer dispersed polyol according to one of the above 1 to 14.

16. Flame retardant polyurethane foam obtained by reacting an active hydrogen compound with polyisocyanate in the presence of a catalyst, cell regulator and blowing agent wherein the active hydrogen compound is polymer dispersed polyol according to one of the above 1 to 14.

Polymer dispersed polyol of the present invention can provide resin component having excellent storage stability, and polyurethane resin and polyurethane foam prepared from the resin component are flame retardant and excellent in durability.

DETAILED DESCRIPTION OF THE INVENTION

Polymer dispersed polyol of the invention includes (1) polymer polyol which is obtained by polymerizing a monomer in polyol and has dispersed polymer particles in the polyol, and (2) polymer polyol which is obtained by polymerizing a monomer in a solvent other than polyol, isolating the resulting polymer microparticles, and dispersing the microparticles in the polyol.

The vinyl polymer microparticle of the invention and polymer polyol of the invention obtained by dispersing the vinyl polymer will be described in detail hereinafter.

Polyol which can be used for preparing polymer polyol of the invention is polyoxyalkylene polyol, polyester polyol, polyester ether polyol, polycarbonate polyol and hydrocarbon-based polyol such as polybutadiene polyol and other polyols which are usually used for a raw material of polyurethane.

Representative polyols include, for example, polyoxyalkylene polyol obtained by addition of ethylene oxide, propylene oxide, butylene oxide, styrene oxide and other epoxides usually in the presence of a catalyst such as one or more compounds selected from an alkali metal compound with one or more amines, or a metal cyanide complex to an initiator which is arbitrarily selected from the group consisting of methanol, butanol, allyl alcohol and other monools; water, ethylene glycol, diethylene glycol, propylene glycol, dipropylene glycol, 1,4-butanediol, 1,6-hexanediol, neopentyl glycol and other diols; glycerol, hexanetriol, trimethylolpropane, pentaerythritol, sorbitol, sucrose and other polyols; bisphenol A, bisphenol F, dihydroxybiphenyl, hydroquinone, resorcinol, flurogluclinol, naphthalenediol, aminophenol, aminonaphthol, phenol formaldehyde condensate and other aromatic compounds; methyldiethariolamine, ethyldiisopropanolamine, monoethanolamine, diethanolamine, triethanolamine, ethylenediamine, hexamethylenediamine, diethylenetriamine, bis(p-aminocyclohexyl) methane, aniline, toluidine, tolylenediamine, diphenylmethanediamine, naphthalenediamine and other amines; and also include polytetramethylene ether glycol obtained by polymerizing tetrahydrofuran in the presence of a boron trifluoride ether complex and other acid catalysts.

Exemplary polyester polyols include those obtained by using glycerol and other polyhydric alcohols as the initiator and carrying out ring-opening addition of ε-caprolactone or γ-butyrolactone etc.; and those obtained by condensation of ethylene glycol, propylene glycol, pentanediol and other diols with terephthalic acid, phthalic anhydride and other dicarboxylic acids and acid anhydrides or dimethyl terephthalate and other dicarboxylic acid esters.

Polyester ether polyols include those obtained by reacting polyether polyol with phthalic anhydride or other dicarboxylic acid anhydride to form half-ester and carrying out dehydration condensation of the half-ester; and those obtained by adding epoxides to the half-ester in the presence of a basic catalyst.

Polycarbonate polyols include those obtained by condensation of low molecular polyol having 2 to 3 valency with dimethyl carbonate, diethyl carbonate and other carbonate diesters.

Polybutadiene polyols include Poly-bd of ARCO Co. and Nisso PB of Nippon Soda Co.

Further, a mixture of two or more polyols arbitrarily selected from these polyols can also be used.

Preferred polyols in these polyols are one or more polyols selected from polyoxyalkylene polyol, polyester polyol and polyester ether polyol which have an average functionality of 1 to 8 and hydroxyl value of 10 to 600 mgKOH/g.

Following vinyl monomers are used for obtaining polymer microparticles, that is, vinyl polymer in the polymer polyol of the invention.

That is, the vinyl monomers which can be used in the invention are:

(A) an acrylamide compound represented by the formula (1) (hereinafter referred to simply as vinyl monomer A):

$$CH_2=CR^1CONR^2R^3 \qquad (1)$$

wherein $R^1$, $R^2$ and $R^3$ are a hydrogen atom or hydrocarbon group having 1 to 10 carbon atoms.

(B) one or more monomer selected from acrylonitrile and methacrylonitrile (hereinafter referred to simply as vinyl monomer B).

(C) a vinyl monomer which is copolymerizable with any vinyl monomers A and B (hereinafter referred to simply as vinyl monomer C), that is, the vinyl monomer C is one or more vinyl monomers selected from the group consisting of the below (i) to (v):

(i) an aromatic vinyl monomer, (ii) a vinyl monomer represented by the formula (3):

$$CH_2=CR^7-COO-R^8 \qquad (3)$$

(iii) a vinyl monomer represented by the formula (4):

$$CH_2=CR^9-OCO-R^{10} \qquad (4)$$

(iv) a vinyl monomer represented by the formula (5):

$$CH_2=CR^{11}-COO-R^{12}-NR^{13}R^{14} \qquad (5)$$

wherein, in the formulas (3) to (5), $R^7$, $R^9$ and $R^{11}$ are a hydrogen atom or methyl group, $R^8$ and $R^{10}$ are an alkyl group having 1 to 20 carbon atoms, $R^{12}$ is an alkylene group having 1 to 6 carbon atoms, and $R^{13}$ and $R^{14}$ are a hydrogen atom or an alkyl group having 1 to 6 carbon atoms and are not simultaneously a hydrogen atom, and (v) acrylic ester or methacrylic ester except the compound represented by the formulas (3) and (5).

Hereinafter, the above vinyl monomers are individually referred to as aromatic vinyl: vinyl monomer C-1, vinyl monomer represented by the formula (3): vinyl monomer C-2, vinyl monomer represented by the formula (4): vinyl monomer C-3, vinyl monomer represented by the formula (5): vinyl monomer C-4, and acrylic ester or methacrylic ester monomer except vinyl monomer represented by the formulas (3) and (5): vinyl monomer C-5.

Vinyl monomer A is an acrylamide compound represented by the formula (1) and is specifically an acrylamide compound (hereinafter referred to as vinyl monomer A-1) wherein both $R^2$ and $R^3$ are hydrogen atoms in the formula (1).

One or more acrylamide derivatives which can be used in vinyl monomer A except those having hydrogen atoms as $R^5$ and $R^6$ in the formula (2) (hereinafter referred to as vinyl monomer A-2) include, specifically, N,N-dimethylacrylamide, N,N-dimethylaminomethylacrylamide, N,N-dimethylaminopropylacrylamide, N-isopropylacrylamide, N-methylolacrylamide, N,N-dimethylolacrylamide, N,N-diethylacrylamide, diacetoneacrylamide, acryloylmorpholine, acryloyl-L-glutamic acid dimethyl ester, acryloyl-L-proline methyl ester, acryloylpyrrolidine, 1,4-diacryloylpiperazine, N,N-dioctylacryloylamide, methylenebis acrylamide and other acrylamide compounds; N,N-dimethylmethacryloylamide, 1-methacryloylimidazole, methacryloyl-L-valine methyl ester, methacryloyl-L-leucine methyl ester and other methacrylamide compounds.

The above vinyl monomer A can be used singly or as a mixture of compounds selected from each group of vinyl monomer A-1 and A-2.

Vinyl monomer B is acrylonitrile and methacrylonitrile and can be used singly or as a mixture, respectively.

Vinyl monomer C is copolymerizable with any vinyl monomer A and B and specifically includes, as vinyl monomer C-1, styrene, α-methylstyrene, 2-methylstyrene, 3-methylstyrene, 4-methylstyrene, 2-vinylphenol, 3-vinylphenol, 4-vinylphenol, p-isopropenylphenol, 3-vinylbenzoic acid, 4-vinylbenzoic acid, 4-vinylthiophenol, 4-methoxystyrene, 4-ethoxystyrene, 4-vinylbiphenyl, sodium p-styrenesulfonate, potassium p-styrenesulfonate, 4-aminostyrene, 5-aminostyrene, 4-dimethylaminostyrene, 4-vinylbenzyl alcohol, 4-phenoxystyrene, 4-vinylbenzoate, 4-acetoxystyrene, vinylphenylacetonitrile, 4-t-butylstyrene, p-octylstyrene, p-cyclohexylstyrene, p-dodecylstyrene, 4-isopropylstyrene, N-(4-vinylphenyl)maleimide, divinylbenzene and other aromatic vinyl monomers. Styrene is preferred in these monomers.

Exemplary vinylmonomer C-2 includes methyl (meth)acrylate, ethyl (meth)acrylate, propyl (meth)acrylate, n-butyl methacrylate, isobutyl (meth)acrylate, t-butyl (meth)acrylate, lauryl (meth)acrylate, and stearyl (meth)acrylate.

Vinyl monomer C-3 specifically includes vinyl acetate, vinyl propionate, vinyl butyrate, vinyl crotonate, vinyl n-hexanoate, vinyl n-octanoate, vinyl n-decanoate, vinyl laurate, vinyl palmitate, and vinyl stearate.

Vinyl monomer C-4 specifically includes N,N-dimethylaminoethyl (meth)acrylate, 3-dimethylaminoneopentyl (meth)acrylate, and 3-(dimethylamino)propyl (meth)acrylate.

Vinyl monomer C-5 is a vinyl monomer having an oxygen containing functional group, and specifically includes glycidyl methacrylate, hydroxyethyl methacrylate, and hydroxypropyl methacrylate.

Preferred vinyl monomer C is styrene in vinyl monomer C-1; methyl methacrylate, butyl acrylate and stearyl acrylate in vinyl monomer C-2; vinyl acetate and vinyl stearate in vinyl monomer C-3; N,N-dimethylaminoethyl methacrylate in vinyl monomer C-4; and glycidyl methacrylate in vinyl monomer C-5.

Polymer polyol of the invention is a dispersion of 5 to 50 wt % of vinyl polymer microparticles in 95 to 50 wt % of polyol. The dispersion can be prepared by polymerizing a vinyl monomer mixture having the below described composition.

The vinyl monomer mixture used for preparing the vinyl polymer of the invention consists of 5 to 80 wt % of acrylamide compound represented by the formula (1) (vinyl monomer A), 0 to 70 wt % of one or more compounds selected from acrylonitrile and methacrylonitrile (vinyl monomer B), and 0 to 95 wt % of a vinyl monomer which is copolymerizable with vinyl monomers A and B, and contains 95 to 20 wt % of the total amount of vinyl monomer B and vinyl monomer C. When vinyl monomer (C) is absent, vinyl monomer A is an acrylamide derivative represented by the formula (2).

Consequently, the vinyl polymer of the invention comprised of the following polymers.
(a) vinyl polymer derived from vinyl monomer mixture containing vinyl monomers A, B and C,
(b) vinyl polymer derived from vinyl monomer mixture containing vinyl monomers A and B (content of vinyl monomer C is 0 wt %), and
(c) vinyl polymer derived from vinyl monomer mixture containing vinyl monomers A and C (content of vinyl monomer B is 0 wt %).

More specifically, it includes combination of following vinyl monomers.

Vinyl Monomer A
vinyl monomer A-1: acrylamide and/or methacrylamide
vinyl monomer A-2: acrylamide derivative
Vinyl Monomer B
vinyl monomer B: acrylonitrile or methacrylonitrile
Vinyl Monomer C
vinyl monomer C-1: aromatic vinyl
vinyl monomer C-2: acrylic ester of the formula (3)
vinyl monomer C-3: vinyl acrylate of the formula (4)
vinyl monomer C-4: acrylic ester of the formula (5)
vinyl monomer C-5: acrylic ester or methacrylic ester except the formulas (3) and (5).

For example, combinations shown in the following table are included:

| | | | | | | | | | | | |
|---|---|---|---|---|---|---|---|---|---|---|---|
| A-1 | ○ | ○ | ○ | ○ | ○ | ○ | ○ | ○ | ○ | ○ | ○ |
| A-2 | — | — | — | — | — | — | — | ○ | ○ | ○ | — |
| B | ○ | — | — | ○ | ○ | ○ | ○ | ○ | ○ | — | ○ |
| C-1 | ○ | ○ | ○ | ○ | — | — | ○ | — | ○ | — | — |
| C-2 | — | — | ○ | — | — | — | — | — | — | ○ | ○ |
| C-3 | — | — | — | — | — | ○ | — | — | — | — | — |
| C-4 | — | — | — | — | ○ | — | ○ | — | — | — | — |
| C-5 | — | — | — | ○ | — | — | — | — | — | — | ○ |
| Corresponding Examples | 1, 2, 3, 4, 7 | 5 | 6, 8, 12 | — | 10 | 11 | 13 | 14 15 16 17 18 19 20 | 21 23 | 22 | — |

The vinyl monomer consists of 5 to 80 wt % of vinyl monomer A, 0 to 70 wt % of vinyl monomer B, and 0 to 95 wt % of vinyl monomer C, and also 20 to 95 wt % of the total amount of vinyl monomers B and C for 100 wt % of the total amount of vinyl monomer A, B and C. When vinyl monomer C is 0 wt t%, vinyl monomer A-2 is used as vinyl monomer A.

When 5 wt % or more vinyl monomer A is used in the vinyl monomer, polyurethane prepared from the resultant polymer polyol has an excellent effect on flame retardance. The amount of less than 5 wt % exerts no effect on flame retardance of polyurethane. When the amount of vinyl monomer A exceeds 80 wt %, the resulting resin component, a mixture of polymer polyol, water as a blowing agent, catalyst and cell regulator, becomes a gel and impairs storage stability.

Further, when vinyl monomer A is a mixture of an acrylamide derivative (a compound of the formula (2) wherein $R^5$ and $R^6$ are not simultaneously a hydrogen atom: vinyl monomer A-2) and acrylamide and/or methacrylamide (a compound of the formula (1) wherein $R^2$ and $R^3$ are simultaneously a hydrogen atom: vinyl monomer A-1), the proportion of vinyl monomer A-2 to the total amount of vinyl monomers A-1 and A-2 is 1 to 99 wt %, preferably 5 to 95 wt %.

Amount of vinyl monomer B is 0 to 70 wt % in the vinyl monomer. The amount of vinyl monomer B exceeding 70 wt % unfavorably lowers humid aged compression set of polyurethane. Vinyl monomer B can be excluded in order to reduce yellowness of polymer polyol or to greatly improve hot wet compression set of polyurethane.

Vinyl monomer C improves storage stability of resin component prepared from the resulting polymer polyol and has effect on improving humid aged compression set of polyurethane.

When the amount of vinyl monomer C-1 is 0 to less than 5 wt % in vinyl monomer, (1) 5 to 80 wt % of vinyl monomer A wherein vinyl monomer A-2 is used singly or as a mixture with one or more compounds selected from acrylamide and methacrylamide (vinyl monomer A-1), and (2) 20 to 95 wt % of vinyl monomer C which contains vinyl monomer B and one or more vinyl monomers selected from vinyl monomers C-2, C-3 and C-4, are used.

Further, when vinyl monomer C-1 is 0 to less than 5 wt % in the vinyl monomer, (1) 5 to 80 wt % of vinyl monomer A which contains one or more compounds selected from acrylamide and methacrylamide (vinyl monomer A-1) and (2) vinyl monomer C which contains 1 to 60 wt % of one or more compounds selected from vinyl monomers C-2, C-3 and C-4 except C-5, are preferably used, and the total amount of vinyl monomer C-5 and vinyl monomer B is from 19 to 94 wt %.

Another vinyl monomer mixture which is preferable used contains 5 to 60 wt % of styrene (aromatic vinyl monomer: vinyl monomer C-1), 15 to 90 wt % of the total amount of vinyl monomer B and one or more monomers selected from vinyl monomers C-2, C-3, C-4, and C-5, and 5 to 80 wt % of vinyl monomer A.

When the amount of vinyl monomer C-1 is less than 5 wt %, polyurethane foam prepared from resulting polymer polyol has insufficient humid aged compression set. On the other hand, the amount exceeding 60 wt % is liable to reduce dispersion stability of the resulting polymer particles.

The above vinyl monomer can be used in the form of a copolymer, and can also be used as a blended mixture of each vinyl homopolymer in the same weight ratio.

Polymer polyol of the invention can be prepared by polymerizing the above vinyl monomer in polyol to disperse microparticles of the resulting vinyl polymer in the polyol, or by polymerizing the above vinyl monomer in a solvent except polyol, isolating the resulting polymer particles and dispersing the polymer particles in a prescribed amount of polyol, or by adding the resulting dispersion of polymer particles in the organic solvent as intact to polyol and successively distilling off the organic solvent. Particularly preferred polymer polyol can be obtained by polymerizing vinyl monomer in polyol.

Polymerization initiators which polymerize vinyl monomer are usually radical initiators for starting polymerization by generating a radical.

Specific initiators include 2,2'-azobisisobutyronitrile, 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate), 2,2'-azobis[2-(hydroxymethyl)propionitrile], 1,1'-azobis(1-acetoxy-1-phenylethane) and other azo compounds; and benzoyl peroxide, dibenzoperoxide, dicumyl peroxide, bis(4-t-butylcyclohexyl) peroxydicarbonate, lauroyl peroxide and other peroxide compounds; sodium persulfate, potassium persulfate, ammonium persulfate and other persulfate salts; and perborate and persuccinate and so on.

These initiators can be used singly or as mixtures. The amount of initiators is usually 0.1 to 10.0 wt %, preferably 0.5 to 5.0 wt % for vinyl monomer.

Polymer polyol is prepared by carry out polymerization by using the above polyol, vinyl monomer and polymerization initiator in the presence of, when necessary, a chain transfer agent, dispersion stabilizer and solvent. The preparation can be carried out batch wise or continuously. Polymerization temperature is determined depending upon the series of the catalyst. Polymerization is carried out usually above the decomposition temperature of the catalyst, preferably in the range of 60 to 200° C., more preferably 80 to 160° C. Polymerization reaction can be carried out under increased pressure or at the atmospheric pressure. Polymerization is usually carried out by feeding a mixture of polyol, vinyl monomer, polymerization initiator and, when necessary, chain transfer agent, dispersion stabilizer and solvent to a reactor at a constant velocity.

Exemplary chain transfer agents which can be used in the polymerization of the invention, if necessary, include specifically methanol, ethanol, propanol, isopropanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 3-methyl-2-butanol, hexyl alcohol, ethylene glycol, propylene glycol, and other aliphatic alcohols; dodecyl mercaptan, mercaptoethanol and other mercaptan compounds; carbon tetrachloride, carbon tetrabromide, chloroform and other halogenated hydrocarbons; triethylamine, tripropylamine, tributylamine, N,N-diethylethanolamine, N-methylmorpholine, N-ethylmorpholine and other aliphatic tertiary amines; sodium metharylsulfonate, sodium arylsulfonate, toluene, xylene, acetonitrile, hexane, heptane, dioxane, ethylene glycol dimethyl ether, and N,N-dimethylformamide. The amount of chain transfer agent is in the range of usually 0.01 to 30.0 wt %, preferably 0.05 to 20 wt %, more preferably 0.1 to 10.0 wt % for the total amount of polyol and vinyl monomer.

Further, polymerization can also be carried out in the presence of the dispersion stabilizer in order to stabilize dispersion of the polymer particles. Dispersion stabilizers which can be used include, for example, carbon-carbon unsaturated bond containing polyester polyol which has been disclosed in Japanese Patent Publication SHO 49-46556, and modified polyols which have an acrylic group, methacrylic group or aryl group at the end of the polymer chain. Further, high molecular weight polyoxyalkylene polyol and polyesterether polyol which substantially do not have carbon-carbon unsaturated bond can also be used.

The polymerization reaction can be carried out without solvent. However, particle size enlargement due to coagulation of polymer particles can be inhibited by carrying out the polymerization reaction in the presence of a proper solvent. When the vinyl monomer is a solid, the solvent can be used for dissolving the vinyl monomer. Some compounds which can be used for the solvent can also exert effect as a chain transfer agent. Preferred solvents include toluene, xylene and other hydrocarbons; water, dimethylformamide, dimethylsulfoxide and other polar compounds; methenol, ethanol, isopropanol, butanol, ethylene glycol, propylene glycol and other aliphatic alcohols having 1 to 4 carbon atoms. These solvents can be used singly or as a mixture. Water and aliphatic alcohols having 1 to 4 carbon atoms are particularly preferred.

No particular limitation is imposed upon the amount of the solvent. However, a small amount is favorable in view of distilling off after polymerization. In the invention, 0.1 to 100 parts by weight of solvent is favorably used for 100 parts by weight of polymer polyol to be obtained. After finishing the polymerization reaction, polymer polyol obtained can be used as intact for a material of polyurethane. However, the product is preferably used after distilling off unreacted monomer, catalyst decomposition product, chain transfer agent and solvent under reduced pressure.

The vinyl polymer contained in the polymer polyol of the invention has a concentration of 5 wt % or more to less than 50 wt % for 100 wt % of the polymer polyol obtained.

The vinyl polymer contained in the polymer polyol of the invention preferably has an average particle size of 0.01 to 10 μm in view of the effect on the dispersion stability of the vinyl polymer and properties of polyurethane. Such a range of particle size can be obtained by properly controlling the species and amount of the above chain transfer agent and dispersion stabilizer, and weight ratio of monomer composition.

Polymer polyol of the invention can be used for a raw material of polyurethane by mixing with other polymer polyols or conventionally known polyols, or also by diluting with the above polyols.

Polyurethane resin of the invention can be obtained by reacting the above polymer polyol as intact or diluted by the above polyol with polyisocyanate in the presence of a catalyst and, if necessary, other auxiliary agents, and also includes polyurethane resins obtained in the presence of a plasticizer, stabilizer, colorant and other auxiliary agents.

Polyurethane foam can select an average hydroxyl value of raw material polyol depending upon uses and molding process of polyurethane foam.

Polyol having an average hydroxyl value of 10 to 100 mgKOH/g is preferably used for preparation of flexible polyurethane foam. For preparation of rigid polyurethane foam, polyol having an average hydroxyl value of 100 to 600 mgKOH/g is preferred.

Further, in the preparation of flexible polyurethane foams, preferred average hydroxyl value of polymer polyol is divided into the following ranges depending upon the temperature of foam shaping stage, that is, 10 to 50 mgKOH/g for high resilience molded foam (cold-cure foam), 30 to 80 mgKOH/g for hot cure molded foam, and 20 to 100 mgKOH/g for slab foam.

Polymer polyol of the invention is preferably used for preparing the flexible polyurethane foam in particular, although it can be used for any types of polyurethane foam.

Conventional polyurethane foams have a burning velocity of 50 to 80 mm/min or more in accordance with the test method of FMVSS 302. The flame retardant polyurethane foam of the invention has the same burning velocity or less, 0 to 30 mm/min in particular, and passes one test. Furthermore, the polyurethane foam extinguishes before the bench mark-A in the horizontal burning test, or has a self-extinguishing property which extinguishes within 50 mm and 60 sec. in accordance with JIS D-1201. The flame retardant polyurethane foam of the invention has an oxygen index of 18 or more, that is, a minimum oxygen concentration required for buring at 23±2° C. is 18% or more on the flame retardance index test method in accordance with JIS D-1201. Further, the flame retardant polyurethane foam of the invention has a compression set of 20% or less in a hot wet state in accordance with JIS K-6401 except at a temperature of 50° C. and humidity of 95%RH.

Any known polyisocyanate which is generally used in the preparation of polyurethane can be used for preparing polyurethane resin and foam of the invention. Representative polyisocyanate includes, for example, 2,4-tolylene diisocyanate, 2,6-tolylene diisocyanate, a 80/20 by weight isomer mixture of the same (TDI-80/20), 65/35 by weight isomer mixture of the same (TDI-65/35), crude tolylene diisocyanate containing polyfunctional tarry compounds, 4,4'-diphenylmethane diisocyanate, 2,4'-diphenylmethane diisocyanate, 2,2'-diphenylmethane diisocyanate, arbitrary isomer mixture of diphenylmethane diisocyanate, crude MDI containing polyfunctional tarry compounds having three or more benzene rings(polymeric MDI), toluidine diisocyanate, xylylene diisocyanate, hexamethylene diisocyanate, carbodiimide and biuret modified compound of these organic polyisocyanate, and prepolymers obtained by modifying with polyol or monool singly or as a mixture. These polyisocyanates can also be used as a mixture of an arbitrary ratio.

No particular limitation is imposed upon the equivalent ratio of polyisocyanate to an active hydrogen compound. However, the ratio of NCO/H(active hydrogen) is preferably in the range of 0.50 to 3.0 on the basis of NCO in polyisocyanate and active hydrogen in polymer polyol, water, and crosslinking agent.

Blowing agents which can be used in the invention are the same as those commonly used for preparing polyurethane foam, and include water, carbon dioxide, cyclopentane, n-pentane, isopentane and other low boiling point hydrocarbons; HFC-245fa and other hydrofluorocarbons, fluorinated ether, and perfluorocarbon. Water is preferably used.

Any catalysts commonly used for preparation of polyurethane can be used in the invention and include, for example, amine catalysts such as triethylamine, tripropylamine, tributylamine, N,N,N',N'-tetramethylhexamethylenediamine, N-methylmorpholine, N-ethylmorpholine, dimethylcyclohexylamine, bis[2-(dimethylamino) ethyl]ether, triethylenediamine and salt of triethylenediamine; and organic metal catalysts such as tin acetate, tin octoate, tin oleate, tin laurate, dibutyltin diacetate, dibutyltin dilaurate, dibutyltin dichloride, lead octoate lead naphthenate, nickel naphthenate and cobalt naphthenate.

These catalysts can be used singly or as an arbitrary mixture and the amount is 0.0001 to 10.0 parts by weight for 100 parts by weight of the active hydrogen compound.

Cell regulators which can be used in the invention are conventionally known organosilicone based surfactants and include, for example, L-520, L-532, L-540, L-544, L-550, L-3600, L-3601, L-5305, L-5307 and L-5309 which are manufactured by Nippon Unicar Co.; SRX-253, SRX-274C, SF-2961 and SF-2962 which are manufactured by Toray-.Dow Corning Co.; F-114, F-121, F-122, F-220, F-230, F-258, F-260B, F-317, F-341, F-601 and F-606 which are manufactured by Shinetsu Silicone Co.; and TFA-4200 and TFA-4202 which are manufactured by Toshiba Silicone Co. These cell regulators can be used singly or as a mixture of an arbitrary ratio, and the amount is 0.1 to 10 parts by weight for 100 parts by weight of active hydrogen compounds.

Crosslinking agents which can be used in the invention include, for example, ethylene glycol, propylene glycol, diethylene glycol, triethylene glycol, 1,3-butanediol, 1,4-butanediol and other polyols; triethanolamine, diethanolamine and other alkanolamines; ethylenediamine, diethylenetriamine, triethylenetetramine and other aliphatic polyamines; aniline, 2,4-trilenediamine, 2,6-trilenediamine and other aromatic polyamines, and compounds which are obtained by adding ethylene oxide and/or propylene oxide to these active hydrogen compounds and have a hydroxyl value of 200 mgKOH/g or more. Further, compounds which are obtained by addition of ethylene oxide and/or propylene oxide to hydroquinone, resorcinol and aniline and have a hydroxyl value of 200 mgKOH/g or more can also be used.

The above polymer polyol as intact or polymer polyol diluted with polyol, catalyst and polyisocyanate are weighed so as to obtain a prescribed equivalent ratio of NCO to active hydrogen in the active hydrogen compounds, mixed by stirring and deaerated under reduced pressure. The reaction mixture is poured into a mold which is previously controlled to a prescribed temperature, for example, 30 to 100° C. Curing is carried out in an oven at a prescribed temperature, for example, 60 to 200° C. for a prescribed time, for example, 1 to 3 days. The desired polyurethane resin is obtained by demolding from the mold.

The above polymer polyol as intact or polymer polyol diluted with polyol, blowing agent, catalyst, cell regulator, crosslinking agent and other auxiliary agents are mixed in a prescribed amount, respectively to prepare resin component.

The resin component is controlled to a prescribed temperature, for example, 20 to 30° C. Polyisocyanate is weighed so as to obtain a prescribed equivalent ratio of NCO to active hydrogen in the resin component and controlled to a prescribed temperature, for example, 20 to 30° C. Successively,. the resin component and polyisocyanate are mixed at high velocity and subjected to free blowing fully or pouring into a mold which is previously controlled to a prescribed temperature, for example, 30 to 70° C. After the foaming liquid is blown and filled in the mold, curing is carried out in an oven, when necessary, at a prescribed temperature, for example, 60 to 200° C. for a prescribed time, for example, 1 to 20 min. Polyurethane foam is demolded and cells opened by crushing, when necessary to obtain the desired polyurethane foam.

The present invention will be illustrated by way of examples hereinafter. Figures in these examples shows part by weight generally.

EXAMPLES 1 TO 23 AND COMPARATIVE EXAMPLES 1 TO 13

Preparation Example of Polymer Polyol

Following materials were used.

Polyol A: Polyether polyol obtained by adding propylene oxide and thereafter ethylene oxide to glycerol in the presence of a KOH catalyst and had a hydroxyl value of 33 mgKOH/g (E0 content is 14 wt %).

Polyol B: Polyether polyol obtained by adding propylene oxide and thereafter ethylene oxide to glycerol in the presence of a KOH catalyst and had a hydroxyl value of 56 mgKOH/g (E0 content is 5.5 wt %).

Dispersion stabilizer A: Polyesterether polyol obtained by reacting succinic anhydride and thereafter ethylene oxide with polyol A and had a hydroxyl value of 29 mgKOH/g.

Vinyl Monomer (A)
AAM: Acrylamide
MAAM: Methacrylamide
DMAAM: N,N-Dimethylacrylamide
IPAAM: Isopropylacrylamide (B)
Acrylonitrile (C)
St: Styrene
MMA: Methyl methacrylate
BA: Butyl acrylate
SA: Stearyl acrylate
VL: Vinyl laurate (lauric acid vinyl ester)
DMAEMA: Dimethylaminoethyl methacrylate Solvent
IPA: Isopropyl alcohol
Water: Deionized water Chain transfer agent
TEA: Triethylamine Initiator
AIBN: 2,2'-Azoisobutyronitrile To a reaction vessel equipped with a condenser, 10 parts of polyol A or polyol B was charged and heated to 90° C. while rotating an anchor type stirrer at a velocity of 400 rpm. A uniform mixture of residual polyol A, monomer, solvent, initiator, and, when necessary, chain transfer agent and dispersion stabilizer was charged over 2 hours with a uniform velocity. Stirring was continued for further an hour at 90° C.

After finishing the reaction, unreacted monomer, initiator, decomposition product of initiator and solvent were distilled off at 120° C. under reduced pressure of 5 mmHG to obtain polymer polyol.

Properties of polymer polyol were measured by the following method.

Viscosity of polymer polyol: Measured with a type B viscosimeter in accordance with JIS (-1557, testing method of polyether for polyurethane.

Preparation Example of Polyurethane Resin

The above polymer polyol and following materials were used.

Polyisocyanate A: M-200 Polymeric MDI having an NCO content of 31.3% (manufactured by Mitsui Chemical Co.)

Catalyst A: 16.5 wt % Solution of triethylenediamine in dipropylene glycol

In a 500 ml cup, 100 g of polymer polyol, 0.03 g of catalyst A and polyisocyanate A (polymeric MDI) in an amount of giving an NCO/H ratio of 1.05 were mixed with a stirrer for 3 minutes at a velocity of 300 rpm and the resulting mixture was deaerated for 15 minutes under reduced pressure of 10 mm/Hg. The resulting mixture was poured into aluminum molds having a cylindrical shape of 30 mm in diameter and 12 mm in depth and a sheet shape of 200×200×1 mm, and was cured at 80° C. for 48 hour in nitrogen atmosphere. Polyurethane resin was obtained by demolding. Properties of the polyurethane resin were measured by the following methods and are shown in the table.

Humid aged compression set: Measured on the above cylindrical polyurethane resin specimen in accordance with JIS K-6401 except at a temperature of 70° C. under humidity of 95% RH.

Oxygen index: Measured on the above polyurethane resin sheet specimen in accordance with JIS D-1201, a method for measuring a flame retardance index. A minimum oxygen concentration required for combustion at 23±2° C. was measured.

Examples 1 to 23 and Comparative Examples 1 to 5 and 11 to 13 show that polymer polyol having 5 to 80 wt % of vinyl monomer (A) improved flame retardance of polyurethane resin.

Any polyurethane resin obtained in Examples 1 to 23 had an oxygen index of 18.6 or more. Comparative Examples 1 to 5 and 13 show that less than 5 wt % of vinyl monomer (A) had no effect on flame retardance, and had an oxygen index of less than 18.0.

Examples 1 to 23 and Comparative Examples 7 to 10 show that vinyl monomer (A) exceeding 80 wt % impaired humid aged compression set and reduced durability of polyurethane resin. Examples 1 to 23 had a humid aged compression set of 7% or less. On the other hand, Comparative Examples 7 to 10 had a humid aged compression set of 14 to 17%.

Comparative Example 11 shows that, when vinyl monomer (A) was 5 to 80 wt % and vinyl monomer (C) was 0%, that is, when the vinyl monomer was acrylamide and acrylonitrile alone, the resulting polyurethane resin impaired humid aged compression set to 12%.

Comparative Example 12 shows that, when vinyl monomer (A) was 5 to 80 wt % and vinyl monomer C-2 was less than 1 wt %, humid aged compression set was not improved.

Preparation Example of Polyurethane Foam

The above polymer polyol and following materials were used.

Polyisocyanate B: TM-20, a polyisocyanate mixture having in an NCO content of 44.9% and consisting of 80 parts of a 80:20 weight ratio mixture of 2,4-tolylene diisocyanate and 2,6-tolylene diisocyanate, and 20 parts of polymeric MDI, M-200 (manufactured by Mitsui Chemicals, Inc.).

Polyisocyanate C: T-80, a polyisocyanate mixture having an NCO content of 48.3% and consisting of a 80:20 weight ratio mixture of 2,4-tolylene diisocyanate and 2,6-tolylene diisocyanate (manufactured by Mitsui Chemicals, Inc.).

Cross-linking agent: KL-210, amine based cross-linking agent having a hydroxyl value of 830 mgKOH/g (manufactured by Mitsui Chemicals, Inc.).

Catalyst B: Minico L-1020, amine catalyst (manufactured by Katsuzai Chemical Co.).

Catalyst C: Niax A-1, amine catalyst (manufactured by ARCO Co.).

Catalyst D: Stannous octoate

Cell regulator A: SRX-274C, silicone cell regulator (manufactured by Toray-Dow Corning Co.).

Cell regulator B: L-520, silicone cell regulator (manufactured by Nippon Union Co.).

Preparation Example of high resilience molded foam (cold cure foam).

Resin component was prepared by mixing the following materials.

| | |
|---|---|
| Polyol A | 50 parts |
| Polymer polyol | 50 parts |
| Cross-linking agent | 3.0 parts |
| Water | 3.4 parts |
| Catalyst B | 0.4 part |
| Catalyst C | 0.1 part |
| Cell regulator A | 1.0 part |

The resin component was allowed to stand at 23° C. for an hour and time dependent stability was visually observed. Results are shown in the table. Successively, polyisocyanate B(TM-20) was weighed in an amount to obtain NCO/H mol ratio (H : active hydrogen in the resin component) of 1.05 and temperature controlled to 23° C.

The above resin component and polyisocyanate were mixed by stirring for 6 seconds and poured into an aluminum mold which was previously temperature controlled to 60° C. and had an internal dimension ratio of 4:4:1 (length:width:depth).

Mold lid was closed and resulting foam was hot cured in a hot air oven at 100° C. for 5 minutes. Foam was taken out of the mold and crushed. Foam properties measured after 24 hours are illustrated in the table, Examples 1 to 22 and Comparative Examples 1 to 12.

Preparation Example of Slab Foam

Resin component was prepared by mixing following raw materials.

| | |
|---|---|
| Polymer polyol | 100 parts |
| Water | 2.7 parts |
| Catalyst B | 0.2 part |
| Cell regulator B | 0.7 part |

And then, 0.16 part of catalyst C was added in the above resin component and mixed, then controlled to 25° C.

Polyisocyanate C (T-80) was weighed in an amount to obtain an NCO/H mol ratio of 1.10 and temperature controlled to 25° C. These liquids were quickly mixed with stirring and poured into a blow box having internal dimensions of 2:2:1 (length:width:depth).

The resulting foam was hot cured in a hot air oven at 120° C. for 10 minutes. Foam properties measured after 24 hours are shown in the table, Example 23 and Comparative Example 13.

Foam properties were measured by the following methods.

Closed cell content: Evaluated by tactile feeling on the foam immediately after demolding and before crushing. Result are indicated by symbols S, SM, M, ML and LL in order of low to high content of closed cell.

Density: Measured in accordance with JIS K-6401.

Overall density: Foam density with skin.

Core density: Foam density after cutting off skin.

Hardness: Indentation hardness was measured in accordance with JIS K-6401.

Tensile strength: Measured in accordance with JIS K-6402.

Elongation: Measured in accordance with JIS K-6402.

Impact resilience: Measured without skin on the surface in accordance with JIS K-6401.

Humid aged compression set: Measured in accordance with JIS K-6401 except at temperature of 50° C. under humidity of 95%RH.

Flammability: Burning velocity is indicated in mm/min according to FMVSS 302.

Oxygen index: Measured minimum oxygen concentration required for buring at 23±2° C. in accordance with JIS D-1201, method for measuring flame retardance index.

Air flowability: Measured in accordance with JIS L-1004.

Examples 1 to 23 and Comparative Examples 6 to 10 show that an amount of vinyl monomer (A) exceeding 80 wt % in polymer polyol impairs storage stability of resulting resin component. Foam could not be prepared from the resin components of Comparative Examples 6 to 10.

Examples 1 to 23 and Comparative Examples 1 to 5, and 13 show that polymer polyol having 5 to 80 wt % of vinyl monomer A can improve flame retardance of resulting polyurethane foam. Flammability 0 mm/min indicates substantially non-combustible. Examples 1 to 23 had an oxygen index of 18.5 or more. Specimens completely burned in the case of polyurethane foams prepared from conventional AN based, AN/St based and MMA based polymer polyol shown in Comparative Examples 1 to 3 and 13. Comparative Examples 4 and 5 show that less than 5 wt % of vinyl monomer (A) exerted no effect on the flame retardance of polyurethane foam. Comparative Examples 1 to 5 and 13 had an oxygen index of less than 18.0.

Comparative Example 11 shows that, when vinyl monomer (A) was 5 to 80 wt % and vinyl monomer (C) was 0%, that is, when polymer polyol was made only from acrylamide and acrylonitrile, the resulting polyurethane foam had a high closed cell content, poor foaming ability, and impaired humid aged compression set of 33%. Comparative Example 12 shows that, when vinyl monomer (A) was 5 to 80 wt % and vinyl monomer C-2 was less than 1%, humid aged compression set was not improved (29%). Examples 1 to 23 had a humid aged compression set of 7 to 20%.

TABLE 1

| Example | 1 | 2 | 3 | 4 | 5 | 6 |
|---|---|---|---|---|---|---|
| Polyol A | 80 | ← | ← | ← | 75 | 80 |
| Polyol B | — | — | — | — | — | — |
| Dispersion stabilizer A | — | — | — | — | 5 | — |
| (A) | | | | | | |
| AAM | 1 | 5 | 10 | 16 | 5 | 5 |
| MAAM | — | — | — | — | — | — |
| DMAAM | — | — | — | — | — | — |
| IPAAM | — | — | — | — | — | — |
| B (AN) | 7 | 4.5 | 3 | 1 | — | — |
| (C) | | | | | | |
| St | 12 | 10.5 | 7 | 3 | 15 | 10 |
| MMA | — | — | — | — | — | 5 |
| BA | — | — | — | — | — | — |
| SA | — | — | — | — | — | — |
| VL | — | — | — | — | — | — |
| DMAEMA | — | — | — | — | — | — |
| IPA | 3 | 18 | 36 | 58 | 18 | 18 |
| TEA | — | — | — | — | — | — |
| H$_2$O | — | — | — | — | — | — |
| Viscosity (mPa · S/ 25° C.) Resin | 3100 | 3200 | 3900 | 4200 | 4000 | 3000 |
| Humid aged compression set (%) | 4.3 | 5.5 | 4 | 6.1 | 3.6 | 3.5 |
| Oxygen index | 18.8 | 19.8 | 21.6 | 23.6 | 20.3 | 19.8 |

TABLE 1-continued

| | | | | | | |
|---|---|---|---|---|---|---|
| Resin component stability | uniform | ← | ← | ← | ← | ← |
| Foam | | | | | | |
| Closed cell content | SM | ← | ← | ← | ← | ← |
| Air flowability (cc/cm²/sec.) | — | — | — | — | — | — |
| Overall density (kgf/m³) | 50 | ← | ← | ← | ← | ← |
| Core density (kgf/m²) | 47.5 | 47.1 | 47.2 | 47 | 47.3 | 47.3 |
| Hardness (kgf/314 cm²) | 18.2 | 18.4 | 20.2 | 20.5 | 18 | 17.8 |
| Tensile strength (kgf/cm²) | 1.3 | 1.24 | 1.18 | 1.11 | 1.25 | 1.2 |
| | 113 | 109 | 108 | 110 | 111 | 108 |
| Elongation (%) | 67 | 67 | 66 | 66 | 67 | 67 |
| Impact resilience (core) (%) | 17 | 18 | 16 | 20 | 13 | 14 |
| Flammability (mm/min) | 0 | 0 | 0 | 0 | 0 | 0 |
| Oxygen index | 19.4 | 21.5 | 22.2 | 23.9 | 21 | 21.3 |
| Monomer composition (%) | | | | | | |
| (A) | 5 | 25 | 50 | 80 | 25 | 25 |
| (B) | 35 | 22.5 | 15 | 5 | 0 | 0 |
| (C) | 60 | 52.5 | 35 | 15 | 75 | 75 |

| Example | 7 | 8 | 9 | 10 | 11 | 12 |
|---|---|---|---|---|---|---|
| Polyol A | 80 | ← | ← | ← | ← | ← |
| Polyol B | — | — | — | — | — | — |
| Dispersion stabilizer A | — | — | — | — | — | — |
| (A) | | | | | | |
| AAM | 15 | 1 | 3 | 5 | 5 | 5 |
| MAAM | — | — | — | — | — | 5 |
| DMAAM | — | — | — | — | — | — |
| IPAAM | — | — | — | — | — | — |
| B (AN) | 4 | 10 | 14 | 12 | 11 | 5 |
| (C) | | | | | | |
| St | 1 | — | — | — | — | — |
| MMA | — | — | — | — | — | — |
| BA | — | 9 | — | — | — | — |
| SA | — | — | 3 | — | — | 5 |
| VL | — | — | — | — | 4 | — |
| DMAEMA | — | — | — | 3 | — | — |
| IPA | — | — | — | — | — | — |
| TEA | — | — | — | — | — | — |
| H₂O | 15 | 1 | 3 | 5 | 5 | 10 |
| Viscosity (mPa·S/25° C.) | 3400 | 2800 | 3300 | 2900 | 2800 | 3100 |
| Resin | | | | | | |
| Humid aged compression set (%) | 6.7 | 4.3 | 4.1 | 3.9 | 4.1 | 5.8 |
| Oxygen index | 23.4 | 18.7 | 19.2 | 19.7 | 19.6 | 21.8 |
| Resin component stability | uniform | ← | ← | ← | ← | ← |
| Foam | | | | | | |
| Closed cell content | SM | ← | ← | ← | ← | ← |
| Air flowability (cc/cm²/sec.) | — | — | — | — | — | — |
| Overall density (kgf/m³) | 50 | ← | ← | ← | ← | ← |
| Core density (kgf/m²) | 47.5 | 47.4 | 46.7 | 46.9 | 48 | 47.1 |
| Hardness (kgf/314 cm²) | 23.7 | 22.3 | 23 | 22.8 | 22.6 | 22.1 |
| Tensile strength (kgf/cm²) | 1.45 | 1.39 | 1.45 | 1.47 | 1.51 | 1.47 |
| Elongation (%) | 110 | 110 | 109 | 110 | 109 | 109 |
| Impact resilience (core) (%) | 66 | 67 | 67 | 67 | 67 | 66 |
| Humid aged compression set (%) | 20 | 15 | 14 | 12 | 14 | 18 |
| Flammability (mm/min) | 0 | 0 | 0 | 0 | 0 | 0 |
| Oxygen index | 20.4 | 18.5 | 19.1 | 19.3 | 19.2 | 19.9 |
| Monomer composition (%) | | | | | | |
| (A) | 75 | 5 | 15 | 25 | 25 | 50 |
| (B) | 20 | 50 | 70 | 60 | 55 | 25 |
| (C) | 5 | 45 | 15 | 15 | 20 | 25 |

| Example | 13 | 14 | 15 | 16 | 17 | 18 |
|---|---|---|---|---|---|---|
| Polyol A | 80 | ← | ← | ← | ← | ← |
| Polyol B | — | — | — | — | — | — |
| Dispersion stabilizer A | — | — | — | — | — | — |
| (A) | | | | | | |
| AAM | 14 | 3 | 5 | 6 | 8 | 1 |
| MAAM | — | — | — | — | — | — |
| DMAAM | — | 3 | 3 | 6 | 8 | 15 |
| IPAAM | — | — | — | — | — | — |
| B (AN) | 4.5 | 14 | 12 | 8 | 4 | 4 |
| (C) | | | | | | |
| St | 0.5 | — | — | — | — | — |
| MMA | — | — | — | — | — | — |
| BA | — | — | — | — | — | — |
| SA | — | — | — | — | — | — |
| VL | — | — | — | — | — | — |
| DMAEMA | 1 | — | — | — | — | — |
| IPA | — | — | — | — | — | — |
| TEA | — | — | — | — | — | — |
| H₂O | 14 | 1 | 5 | 6 | 8 | 1 |
| Viscosity (mPa·S/25° C.) | 3200 | 3000 | 2700 | 2600 | 2800 | 2700 |
| Resin | | | | | | |
| Humid aged compression set (%) | 6.3 | 4 | 3.2 | 1.1 | 0.8 | 1.3 |
| Oxygen index | 23 | 20.3 | 21.2 | 21.9 | 22.8 | 22.6 |
| Resin component stability | uniform | ← | ← | ← | ← | ← |
| Foam | | | | | | |
| Closed cell content | SM | ← | ← | ← | ← | ← |
| Air flowability (cc/cm²/sec.) | — | — | — | — | — | — |
| Overall density (kgf/m³) | 50 | ← | ← | ← | ← | ← |
| Core density (kgf/m²) | 46.8 | 47.7 | 46.5 | 47.1 | 46.9 | 47.7 |
| Hardness (kgf/314 cm²) | 23.5 | 22.5 | 23.2 | 22.7 | 21.5 | 22 |
| Tensile strength (kgf/cm²) | 1.44 | 1.5 | 1.49 | 1.4 | 1.33 | 1.48 |
| Elongation (%) | 110 | 109 | 108 | 109 | 107 | 106 |
| Impact resilience (core) (%) | 66 | 67 | 67 | 67 | 67 | 66 |
| Humid aged compression | 19 | 13 | 12 | 11 | 10 | 10 |

TABLE 1-continued

| | | | | | | |
|---|---|---|---|---|---|---|
| set (%) | | | | | | |
| Flammability (mm/min) | 0 | 0 | 0 | 0 | 0 | 0 |
| Oxygen index | 20.1 | 19.3 | 18.9 | 19.2 | 19.5 | 19.8 |
| Monomer composition (%) | | | | | | |
| (A) | 70 | 30 | 40 | 60 | 80 | 80 |
| (B) | 22.5 | 70 | 60 | 40 | 20 | 20 |
| (C) | 7.5 | 0 | 0 | 0 | 0 | 0 |

| Example | 19 | 20 | 21 | 22 | 23 |
|---|---|---|---|---|---|
| Polyol A | 80 | ← | ← | ← | — |
| Polyol B | — | — | — | — | 49 |
| Dispersion stabilizer A | — | — | — | — | 5 |
| (A) | | | | | |
| AAM | 15 | 5 | 4.5 | 5 | 10 |
| MAAM | — | — | — | — | — |
| DMAAM | 1 | — | 4 | 5 | — |
| IPAAM | — | 5 | — | — | — |
| B (AN) | 4 | 10 | 11 | — | 12 |
| (C) | | | | | |
| St | — | — | 0.5 | — | 24 |
| MMA | — | — | — | 10 | — |
| BA | — | — | — | — | — |
| SA | — | — | — | — | — |
| VL | — | — | — | — | — |
| DMAEMA | — | — | — | — | — |
| IPA | — | — | — | — | 36 |
| TEA | — | — | — | — | 4 |
| H$_2$O | 15 | 10 | 4.5 | 5 | — |
| Viscosity (mPa·S/25° C.) | 2700 | 2700 | 2600 | 3000 | 3700 |
| Resin | | | | | |
| Humid aged compression set (%) | 5.9 | 2.9 | 2 | 1.2 | 6.6 |
| Oxygen index | 23.5 | 21.6 | 21 | 21.4 | 23.6 |
| Resin component stability | uniform | ← | ← | ← | ← |
| Foam | | | | | |
| Closed cell content | SM | ← | ← | ← | — |
| Air flowability (cc/cm$^2$/sec.) | — | — | — | — | 78 |
| Overall density (kgf/m$^3$) | 50 | ← | ← | ← | — |
| Core density (kgf/m$^3$) | 46.2 | 47.6 | 46 | 47 | 36.4 |
| Hardness (kgf/314 cm$^2$) | 22.9 | 23.1 | 23.5 | 22.6 | 43.1 |
| Tensile strength (kgf/cm$^2$) | 1.45 | 1.36 | 1.5 | 1.41 | 1.45 |
| Elongation (%) | 107 | 105 | 108 | 108 | 60 |
| Impact resilience (core) (%) | 67 | 66 | 66 | 67 | 27 |
| Humid aged compression set (%) | 18 | 12 | 12 | 12 | 7.5 |
| Flammability (mm/min) | 0 | 0 | 0 | 0 | 0 |
| Oxygen index | 20.5 | 19.3 | 19.1 | 19.3 | 21.1 |
| Monomer composition (%) | | | | | |
| (A) | 80 | 50 | 42.5 | 50 | 22 |
| (B) | 20 | 50 | 55 | 0 | 26 |
| (C) | 0 | 0 | 2.5 | 50 | 52 |

TABLE 2

| Comparative Example | 1 | 2 | 3 | 4 | 5 | 6 |
|---|---|---|---|---|---|---|
| Polyol A | 80 | ← | ← | ← | ← | ← |
| Polyol B | — | — | — | — | — | — |
| Dispersion stabilizer A | — | — | — | — | — | — |
| (A) | | | | | | |
| AAM | — | — | — | 0.5 | 0.5 | 18 |
| MAAM | — | — | — | — | — | — |
| DMAAM | — | — | — | — | — | — |
| IPAAM | — | — | — | — | — | — |
| B (AN) | 20 | 6 | — | 7.5 | 19.5 | 0.5 |
| (C) | | | | | | |
| St | — | 14 | — | 12 | — | 1.5 |
| MMA | — | — | 20 | — | — | — |
| BA | — | — | — | — | — | — |
| SA | — | — | — | — | — | — |
| VL | — | — | — | — | — | — |
| DMAEMA | — | — | — | — | — | — |
| IPA | — | — | — | 1.5 | — | 65 |
| TEA | — | — | — | — | — | — |
| H$_2$O | — | — | — | — | 0.5 | — |
| Viscosity (mPa·S/25° C.) | 2900 | 2700 | 2600 | 3000 | 3000 | 4500 |
| Resin | | | | | | |
| Humid aged compression set (%) | 7.1 | 3.8 | 9.3 | 4.5 | 8.5 | — |
| Oxygen index | 17.4 | 17 | 17 | 17.7 | 17.9 | — |

TABLE 2-continued

|  |  |  |  |  |  |  |  |
|---|---|---|---|---|---|---|---|
| Resin component stability | uniform | ← | ← | ← | ← | gel |  |
| Foam |  |  |  |  |  |  |  |
| Closed cell content | SM | M | M | ← | L |  |  |
| Air flowability (cc/cm²/sec.) | — | — | — | — | — |  |  |
| Overall density | 50 | ← | ← | ← | ← |  |  |
| Core density (kgf/m²) | 47.6 | 47.8 | 47.4 | 47.7 | 46.9 |  |  |
| Hardness (kgf/314 cm²) | 24.5 | 22.9 | 19.5 | 19 | 23.8 |  |  |
| Tensile strength (kgf/cm²) | 1.54 | 1.15 | 1.19 | 1.17 | 1.4 |  |  |
| Elongation (%) | 110 | 110 | 109 | 110 | 109 |  |  |
| Impact resilience (core) (%) | 66 | 66 | 66 | 65 | 66 |  |  |
| Humid aged compression set (%) | 18 | 16 | 18 | 17 | 20 |  |  |
| Flammability (mm/min) | 61 | 62 | 65 | 50 | 55 |  |  |
| Oxygen index | 17.4 | 17.5 | 17 | 17.9 | 17.9 |  |  |
| Monomer composition (%) |  |  |  |  |  |  |  |
| (A) | 0 | 0 | 0 | 2.5 | 2.5 | 90 |  |
| (B) | 100 | 30 | 0 | 37.5 | 97.5 | 2.5 |  |
| (C) | 0 | 70 | 100 | 60 | 0 | 7.5 |  |

| Comparative Example | 7 | 8 | 9 | 10 | 11 | 12 | 13 |
|---|---|---|---|---|---|---|---|
| Polyol A | 80 | ← | ← | ← | ← | ← | — |
| Polyol B | — | — | — | — | — | — | 49 |
| Dispersion stabilizer A | — | — | — | — | — | — | 5 |
| (A) |  |  |  |  |  |  |  |
| AAM | 20 | 2 | 16 | 18 | 5 | 5 | — |
| MAAM | — | — | — | — | — | — | — |
| DMAAM | — | 16 | 2 | — | — | — | — |
| IPAAM | — | — | — | — | — | — | — |
| B (AN) | — | 2 | 2 | 2 | 15 | 14.9 | 14 |
| (C) |  |  |  |  |  |  |  |
| St | — | — | — | — | — | — | 32 |
| MMA | — | — | — | — | — | — | — |
| BA | — | — | — | — | — | — | — |
| SA | — | — | — | — | — | 0.1 | — |
| VL | — | — | — | — | — | — | — |
| DMAEMA | — | — | — | — | — | — | — |
| IPA | — | — | — | — | — | — | 36 |
| TEA | — | — | — | — | — | — | 4 |
| H₂O | 20 | 2 | 16 | 18 | 5 | 5 | — |
| Viscosity (mPa · S/25° C.) | 2600 | 2600 | 2600 | 2700 | 2500 | 2500 | 4400 |
| Resin |  |  |  |  |  |  |  |
| Humid aged compression set (%) | 16.4 | 14.1 | 15.3 | 15.5 | 12 | 11.7 | 5.3 |
| Oxygen index | 23.9 | 18.7 | 23.6 | 23.7 | 21 | 20.8 | 17.5 |
| Resin component stability | gel | ← | ← | ← | uniform | ← | ← |
| Foam |  |  |  |  |  |  |  |
| Closed cell content |  |  |  |  | LL | L | — |
| Gas permeability (cc/cm²/sec.) |  |  |  |  | — | — | 80 |
| Overall density (kgf/m²) |  |  |  |  | 50 | 50 | — |
| Core density (kgf/m²) |  |  |  |  | 45.1 | 45.5 | 36.8 |
| Hardness (kgf/314 cm²) |  |  |  |  | 21.2 | 21.5 | 44 |
| Tensile strength (kgf/cm²) |  |  |  |  | 1.28 | 1.3 | 1.43 |
| Elongation (%) |  |  |  |  | 104 | 104 | 59 |
| Impact resilience (core) (%) |  |  |  |  | 66 | 66 | 27 |
| Humid aged compression set (%) |  |  |  |  | 33 | 29 | 7 |
| Flammability (mm/min) |  |  |  |  | 0 | 0 | 75 |
| Oxygen index |  |  |  |  | 19.1 | 19 | 17.7 |
| Monomer composition (%) |  |  |  |  |  |  |  |
| (A) | 100 | 90 | 90 | 90 | 25 | 25 | 0 |

TABLE 2-continued

| (B) | 0 | 10 | 10 | 10 | 75 | 74.5 | 30 |
|---|---|---|---|---|---|---|---|
| (C) | 0 | 0 | 0 | 0 | 0 | 0.5 | 70 |

What is claimed is:

1. Polymer dispersed polyol having a vinyl polymer dispersed in polyol, the vinyl polymer prepared from vinyl monomers comprising 5 to 80 wt % of acrylamide compound (A) represented by the formula (1):

$$CH_2=CR^1CONR^2R^3 \quad (1)$$

wherein $R^1$, $R^2$ and $R^3$ are a hydrogen atom or hydrocarbon group having 1 to 10 carbon atoms, 0 to 70-wt % of one or more monomer (B) selected from acrylonitrile and methacrylonitrile, 0 to 95 wt % of a vinyl monomer (C) which is copolymerizable with (A) and (B), and is one or more compounds selected from the group consisting of:
(1) an aromatic vinyl monomer,
(2) a compound represented by the formula (3):

$$CH_2=CR^7-COO-R^8 \quad (3)$$

(3) a compound represented by the formula (4):

$$CH_2=CR^9-OCO-R^{10} \quad (4)$$

(4) a compound represented by the formula (5):

$$CH_2=CR^{11}-COO-R^{12}-NR^{13}R^{14} \quad (5)$$

wherein, in the formulas (3) to (5), $R^7$, $R^9$ and $R^{11}$ are a hydrogen atom or methyl group, $R^8$ and $R^{10}$ are an allyl group having 1 to 20 carbon atom, $R^{12}$ is an alkylene group having 1 to 6 carbon atoms, $R^{13}$ and $R^{14}$ are a hydrogen atom or alkyl group having 1 to 6 carbon atoms and are not simultaneously a hydrogen atom, and
(5) acrylic ester and methacrylic ester except the compounds represented by the formulas (3) and (5), and with the exception of α,β-ethylenically unsaturated carboxylic anhydride, wherein 95 to 20 wt % of the vinyl monomers for preparing the vinyl polymer is composed of the total amount of (B) and (C);
and a) when (C) is 0 wt %, (A) is a vinyl monomer containing an acrylamide derivative represented by the formula (2):

$$CH_2=CR^4CONR^5R^6 \quad (2)$$

wherein $R^4$, $R^5$, and $R^6$ are a hydrogen atom or hydrocarbon group having 1 to 10 carbon atoms, and not simultaneously a hydrogen atom, and b) when (C) contains 5 to 60 wt % styrene, (C) further contains one or more compounds selected from the group consisting of the above formulas (3) to (5), acrylic ester or methacrylic ester except the compounds represented by formulas (3) to (5), and the amount of (B) and (C) except styrene is 15 to 90 wt %, and said polyol comprising 5 to 50 wt % of the vinyl polymer.

2. Polymer dispersed polyol having a vinyl polymer dispersed in polyol, the vinyl polymer prepared from vinyl monomers comprising 5 to 80 wt % of acrylamide compound (A) represented by the formula (1):

$$CH_2=CR^1CONR^2R^3 \quad (1)$$

wherein $R^1$, $R^2$ and $R^3$ are a hydrogen atom or hydrocarbon group having 1 to 10 carbon atoms, 5 to 35 wt % of one or more monomer (B) selected from acrylonitrile and methacrylonitrile, and 5 to 60 wt % of an aromatic vinyl monomer (C-1) which is copolymerizable with (A) and (B), and the total amount (B) and (C) is 95 to 20 wt %, and said polyol comprising 5 to 50 wt % of the vinyl polymer.

3. Polymer dispersed polyol having a vinyl polymer dispersed in polyol, the vinyl polymer prepared from vinyl monomers comprising 25 to 50 wt % of acrylamide compound (A) represented by the formula (1):

$$CH_2=CR^1CONR^2R^3 \quad (1)$$

wherein $R^1$, $R^2$ and $R^3$ are a hydrogen atom or hydrocarbon group having 1 to 10 carbon atoms, and 50 to 75 wt % of a vinyl monomer (C) which is copolymerizable with (A), and is one or more compounds selected from the group consisting of:

(1) an aromatic vinyl monomer,
(2) a compound represented by the formula (3):

$$CH_2=CR^7-COO-R^8 \quad (3)$$

(3) a compound represented by the formula (4):

$$CH_2=CR^9-OCO-R^{10} \quad (4)$$

(4) a compound represented by the formula (5):

$$CH_2=CR^{11}-COO-R^{12}-NR^{13}R^{14} \quad (5)$$

wherein, in the formulas (3) to (5), $R^7$, $R^9$ and $R^{11}$ are a hydrogen atom or methyl group, $R^8$ and $R^{10}$ are an alkyl group having 1 to 20 carbon atom, $R^{12}$ is an alkylene group having 1 to 6 carbon atoms, $R^{13}$ and $R^{14}$ are a hydrogen atom or alkyl group having 1 to 6 carbon atoms and are not simultaneously a hydrogen atom, and (5) acrylic ester and methacrylic ester except the compounds represent by the formulas (3) and (5), and said polyol comprising 5 to 50 wt % of the vinyl polymer.

4. Polymer dispersed polyol according to claim 1 wherein the acrylamide compound (A) is one or more compounds selected from acrylamide and methacrylamide, and an acrylamide derivative represented by the formula (2) above.

5. Polymer dispersed polyol according to claim 4 wherein the acrylamide derivative is one or more compounds selected from the group consisting of N,N-dimethylacrylamide, N,N-dimethylaminomethylacrylamide, N,N-dimethylaminopropylacrylamide, N-isopropylacrylamide, N,N-diethylacrylamide and N,N-dimethylmethacryloylamide.

6. Polymer dispersed polyol according to claim 1 wherein the vinyl monomer (C) which is copolymerizable with the above (A) and (B) contains 5 to 60 wt % of an aromatic vinyl monomer.

7. Polymer dispersed polyol according to claim 1 wherein the vinyl monomers (C) which is copolymerizable with the above (A) and (B) contains 5 to 60 wt % of the aromatic vinyl monomer, and comprises a compound represented by the above formulas (3) to (5) and one or more compounds selected from the group consisting of acrylic ester or methacrylic ester except the compounds represented by the formulas (3) and (5), and the total amount of the monomer except the aromatic vinyl monomer in (C) and one or more compounds (B) selected from acrylonitrile and methacrylonitrile is from 15 to 90 wt %.

8. Polymer dispersed polyol according to claim 7 wherein the aromatic vinyl monomer is styrene.

9. Polymer dispersed polyol according to claim 7 wherein the compound represented by the formula (3) is one or more compounds selected from methyl methacrylate and butyl methacrylate.

10. Polymer dispersed polyol according to claim 7 wherein the acrylic ester or methacrylic ester compound except the compound represented by the formulas (3) and (5) is one or more compounds selected from the group consisting of glycidyl methacrylate, hydroxyethyl methacrylate and hydroxypropyl methacrylate.

11. Polymer dispersed polyol according to claim 1 wherein the vinyl monomer (C) which is copolymerizable with the above (A) and (B) contains 0 to less than 5 wt % of styrene and a monomer except styrene, and the total amount of the monomer except styrene in (C) and one or more monomers (B) selected from acrylonitrile and methacrylonitrile is from 20 to 95 wt %.

12. Polymer dispersed polyol according to claim 4 wherein the vinyl monomer (C) which is copolymerizable with the above (A) and (B) contains 0 to less than 5 wt % of styrene, and the compound represented by the formulas (3) to (5), and an acrylic ester or methacrylic ester compound except the compound represented by the formulas (3) and (5), and the total amount of the compound represented by the formulas (3) and (5), and an acrylic ester or methacrylic ester compound except the compound represented by the formulas (3) and (5), and, one or more monomer (B) selected from acrylonitrile and methacrylonitrile is from 20 to 95 wt %.

13. Polymer dispersed polyol according to claim 1 wherein the acrylamide compound (A) is one or more compounds selected from the group consisting of acrylamide and methacrylamide, and a vinyl monomer (C) contains 1 to 60 wt % of one or more compounds represented by the formulas (3), (4) and (5) and 0 to 5 wt % of styrene, and the total amount of the compounds (C) except the both styrene and compound represented by the formulas (3) to (5) and one or more monomer (B) selected from acrylonitrile and methacrylonitrile is from 19 to 94 wt %.

14. Polymer dispersed polyol according to claim 1 obtained by polymerizing in a polyol a monomer mixture containing an acrylamide compound (A), one or more monomers (B) selected from acrylonitrile and methacrylonitrile and a vinyl monomer (C) which is copolymerizable with (A) and (B).

15. Polymer dispersed polyol according to claim 1 wherein the polyol is one or more polyols selected from polyoxyalkylene polyol, polyester polyol and polyester ether polyol having an average functionality of 1 to 8 and a hydroxyl value of 10 to 600 mgKOH/g.

16. Flame retardant polyurethane resin obtained by reacting an active hydrogen compound with polyisocyanate wherein the active hydrogen compound is polymer dispersed polyol according to claim 1.

17. Flame retardant polyurethane foam obtained by reacting an active hydrogen compound with polyisocyanate in the presence of a catalyst, cell regulator and blowing agent, wherein the active hydrogen compound is polymer dispersed polyol according to claim 1.

18. Polymer dispersed polyol according to claim 6 wherein the aromatic vinyl monomer vinyl monomer is styrene.

19. Polymer dispersed polyol according to claim 1 wherein the compound represented by the formula (3) is one or more compounds selected from methyl methacrylate and butyl methacrylate.

20. Polymer dispersed polyol according to claim 1 wherein the acrylic ester or methacrylic ester compound except the compound represented by the formulas (3) and (5) is one or more compounds selected from the group consisting of glycidyl methacrylate, hydroxyethyl methacrylate and hydroxypropyl methacrylate.

* * * * *

UNITED STATES PATENT AND TRADEMARK OFFICE
CERTIFICATE OF CORRECTION

PATENT NO. : 6,117,937
DATED : September 12, 2000
INVENTOR(S) : Shinsuke Matsumoto, Ariko Nishikawa, Tsukuru Izukawa, Masahiro Isobe, Kazunhiko Okubo It is certified that error appears in the above-identified patent and that said Letters Patent is hereby corrected as shown below:

Claim 1,
Line 36, the reference to "carbon atom" should read -- carbon atoms --.

Claim 2,
Line 11, the reference to "(C)" should read -- (C-1) --.

Claim 3,
Line 39, the reference to "carbon atom" should read -- carbon atoms --.

Claim 7,
Line 2, the reference to "monomers" should read -- monomer --.

Signed and Sealed this

Twelfth Day of March, 2002

Attest:

Attesting Officer

JAMES E. ROGAN
Director of the United States Patent and Trademark Office